United States Patent
Zhang

(10) Patent No.: US 7,204,862 B1
(45) Date of Patent: Apr. 17, 2007

(54) PACKAGED THIN FILM BATTERIES AND METHODS OF PACKAGING THIN FILM BATTERIES

(75) Inventor: Ji-Guang Zhang, Marietta, GA (US)

(73) Assignee: Excellatron Solid State, LLC, Atlanta, GA (US)

( * ) Notice: Subject to any disclaimer, the term of this patent is extended or adjusted under 35 U.S.C. 154(b) by 690 days.

(21) Appl. No.: 10/047,407

(22) Filed: Jan. 10, 2002

(51) Int. Cl.
*H01M 6/00* (2006.01)

(52) U.S. Cl. .................................. 29/623.1; 29/623.2

(58) Field of Classification Search .............. 29/623.1, 29/623.2, 623.3; 429/162, 163, 177, 185, 429/174
See application file for complete search history.

(56) References Cited

U.S. PATENT DOCUMENTS

| | | | |
|---|---|---|---|
| 3,237,078 A | 2/1966 | Mallory | 320/17 |
| 3,393,555 A | 7/1968 | Whoriskey et al. | 320/18 |
| 4,154,902 A | 5/1979 | Schwartz | 429/15 |
| 4,303,877 A | 12/1981 | Meinhold | 320/6 |
| 4,614,905 A | 9/1986 | Petersson et al. | 320/18 |
| 4,654,281 A | 3/1987 | Anderman et al. | 429/232 |
| 4,719,401 A | 1/1988 | Altmejd | 320/13 |
| 4,996,129 A | 2/1991 | Tuck | 429/194 |
| 5,270,635 A | 12/1993 | Hoffman et al. | 320/21 |
| 5,291,116 A | 3/1994 | Feldstein | 320/4 |
| 5,314,765 A | 5/1994 | Bates | 429/194 |
| 5,336,573 A | 8/1994 | Zuckerbrod et al. | 429/252 |
| 5,338,625 A | 8/1994 | Bates et al. | 429/193 |
| 5,362,581 A | 11/1994 | Chang et al. | 429/249 |
| 5,387,857 A | 2/1995 | Honda et al. | 320/17 |
| 5,411,592 A | 5/1995 | Ovshinsky et al. | 118/718 |
| 5,445,906 A | 8/1995 | Hobson et al. | 429/162 |
| 5,455,126 A | 10/1995 | Bates et al. | 429/127 |
| 5,512,147 A | 4/1996 | Bates et al. | 204/192.15 |
| 5,561,004 A | 10/1996 | Bates et al. | 429/162 |
| 5,567,210 A | 10/1996 | Bates et al. | 29/623.5 |
| 5,569,520 A | 10/1996 | Bates | 429/162 |
| 5,589,291 A | 12/1996 | Carlin et al. | 429/103 |
| 5,597,660 A | 1/1997 | Bates et al. | 429/191 |
| 5,612,152 A | 3/1997 | Bates | 429/152 |
| 5,654,084 A | 8/1997 | Egert | 428/215 |
| 5,778,515 A | 7/1998 | Menon | 28/623.4 |
| 5,783,928 A | 7/1998 | Okamura | 320/122 |
| 5,811,205 A | 9/1998 | Andrieu et al. | 429/137 |
| 5,821,733 A | 10/1998 | Turnbull | 320/116 |

(Continued)

OTHER PUBLICATIONS

Journal of Power Sources 68 (1997) pp. 65-68 "Thin film solid electrolytes and electrodes for rechargeable lithium-ion batteries" J. Schoonman & E.M. Kelder, no month available.

(Continued)

*Primary Examiner*—Raymond Alejandro
(74) *Attorney, Agent, or Firm*—Baker Donelson

(57) ABSTRACT

A packaged battery (10) and method of producing such is provided having a thin film lithium battery cell (11) sealably encased within a packaging layer (12). The battery cell (11) includes a substrate (13), an anode (16), an electrolyte (15), a cathode (14), a passivation layer (19), an anode current collector (17) and a cathode current collector (18). The packaged battery is produced by heat sealing a packaging foil (21, 22) to the exterior surfaces of the battery cell (11).

16 Claims, 2 Drawing Sheets

U.S. PATENT DOCUMENTS

| | | | |
|---|---|---|---|
| 5,932,375 A | 8/1999 | Tarcy et al. | 429/231 |
| 6,187,472 B1* | 2/2001 | Shiota et al. | 429/127 |
| 6,197,450 B1 | 3/2001 | Nathan et al. | 429/236 |
| 6,235,425 B1 | 5/2001 | Hanson et al. | 429/209 |
| 6,284,406 B1* | 9/2001 | Xing et al. | 429/96 |
| 2002/0071989 A1* | 6/2002 | Verma et al. | 429/176 |

OTHER PUBLICATIONS

"The preparation and characterization of lithium cobalt oxide thin films." LPCVD pp. 213-217, no specific date available.

"Fabrication of LiCoO2 thin film cathodes for rechargable lithium battery by electrostatic spray pyrolysis" Solis State Ionic 80(1995)1-4.

Journal of materials science 31 (1996) 5437-5442 "Unique porous LiCoO2 thin layers prepared by electrostatic spray deposition." C.H. Chen, E.M. Kelder, J. Schoonman.

Journal of power sources 54 (1995) 362-366 "Thin film cathodes for secondary lithium batteries" P. Fragnaud, R. Nagarajan, D.M. Scleich, D. Vujic.

* cited by examiner

PACKAGED THIN FILM BATTERIES AND METHODS OF PACKAGING THIN FILM BATTERIES

TECHNICAL FIELD

This invention relates generally to thin film batteries, and more particularly to packaged thin film batteries and methods of packaging thin film batteries.

BACKGROUND OF THE INVENTION

The metal lithium of thin film batteries reacts rapidly upon exposure to atmospheric elements such as oxygen, nitrogen, carbon dioxide and water vapor. Thus, the lithium anode of a thin film battery will react in an undesirable manner upon exposure to such elements if the anode is not suitably protected. Other components of a thin film battery, such as a lithium electrolyte and cathode films, also require protection from exposure to air, although these components are commonly not as reactive as thin metal anode films. It should therefore be desirable to incorporate within a lithium or lithium intercalation compound battery, which includes an anode of lithium and other air-reactive components, a packaging system that satisfactorily protects the battery components from exposure to air.

Polymer batteries have been constructed in a manner in which the battery has an intermediary structure wherein a porous spacer exists between the anode and cathode. The partially constructed battery cell is then placed within a protective "bag" which is sealed along three edges. Once the battery cell is positioned within the bag a liquid electrolyte is poured into the bag to occupy the space within the porous spacer between the anode and cathode. The open edge or forth edge of the bag is then heat sealed, as shown in U.S. Pat. No. 6,187,472. During the last steps of this process however air or other gases occupy spaces within the bag. These gases are entrapped within the bag once it is sealed. Much care must also be exercised during the sealing process to insure that the heat seal does not contact the battery cell within the bag as the heat will harm the polymer battery cell.

In the past packaging systems for batteries have been devised which included a shield which overlays the active components of the battery. These shields have been made of a ceramic material, a metallic material, and a combination of ceramic and metallic materials. The construction of thin film batteries however have proven to be quite difficult to produce and in providing an appropriate barrier as gas pockets may be capture between the anode and the protective layer during construction.

Another thin film battery packaging system has been devised wherein alternating layers of parylene and titanium are laid over the active components. The alternating layers are provided to restrict the continuation of pin holes formed in the layers during construction. This method of producing a protective layer has been difficult to achieve and has provided a protective layer which remains effective for only a short time.

It thus is seen that a need remains for a packaging system for thin film batteries which overcomes problems associated with those of the prior art. Accordingly, it is to the provision of such that the present invention is primarily directed.

SUMMARY OF THE INVENTION

In a preferred form of the invention, a method of sealing a battery cell having a top surface, a bottom surface and peripheral edges, comprises the steps of (a) positioning a first layers of packaging foil over the top surface of the battery cell, (b) positioning a second layer of packaging foil over the bottom surface of the battery cell, and (c) heat sealing the first layer of packaging foil to the top surface of the battery cell, heat sealing the second layer of packaging foil to the bottom surface of the battery cell, and heat sealing the first layer of packaging foil to the second layer of packaging foil about the periphery of the battery cell.

In another preferred form of the invention, a thin film battery comprises a battery cell having a cathode, an anode, an electrolyte, and a packaging foil encapsulating the battery cell. The packaging foil being sealed to the majority of the exterior surface of the battery cell.

DETAILED DESCRIPTION

Figure 1:
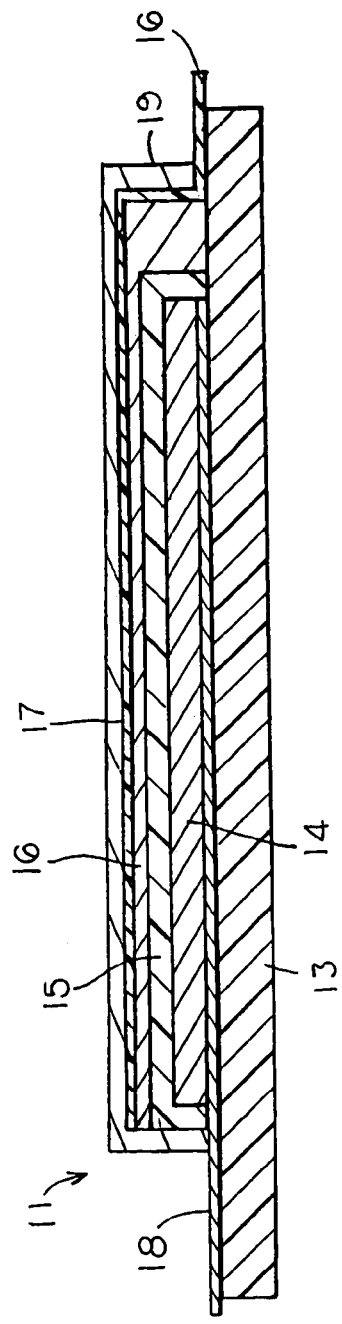
FIG. 1 is a cross-sectional side-view of a thin film battery cell.

With reference next to the drawings, there is shown in a packaged battery 10 embodying principles of the invention in a preferred form. The packaged battery 10 has a thin film lithium or lithium ion battery cell 11 encased within a packaging layer 12. The battery cell 11 includes a substrate 13, a cathode 14, an electrolyte 15, an anode 16, a passivation layer 19, a cathode anode current collector 18 and an anode current collector 17. The cathode 14 is made of a lithium metal or lithium intercalation compound, preferably a metal oxide such as $LiNiO_2$, $V_2O_5$, $Li_xMn_2O_4$, $LiCoO_2$ or $TiS_2$. The electrolyte 15 is preferable made of lithium phosphorus oxynitride, $Li_xPO_yN_z$. The anode 16 is preferably made of silicon-tin oxynitride, SiTON, when used in lithium ion batteries, or other suitable materials such as lithium metal, zinc nitride or tin nitride. Finally, an anode current collector 17 and cathode current collector 18 are preferably made of copper or nickel. The battery cell 11 is preferably manufactured in a manner described in detail in U.S. patent application Ser. No. 5,561,004, which is specifically incorporated herein.

With reference next to the drawings, there is shown in a packaged battery 10 embodying principles of the invention in a preferred form. The packaged battery 10 has a thin film lithium or lithium ion battery cell 11 encased within a packaging layer 12. The battery cell 11 includes a substrate 13, a cathode 14, an electrolyte 15, an anode 16, a passivation layer 19, a cathode current collector 18 and an anode current collector 17. The cathode 14 is made of a lithium metal or lithium intercalation compound, preferably a metal oxide such as $LiNiO_2$, $V_2O_5$, $Li_xMn_2O_4$, $LiCoO_2$ or $TiS_2$. The electrolyte 15 is preferable made of lithium phosphorus oxynitride, $Li_xPO_yN_z$. The anode 16 is preferably made of silicon-tin oxynitride, SiTON, when used in lithium ion batteries, or other suitable materials such as lithium metal, zinc nitride or tin nitride. Finally, an anode current collector 17 and cathode current collector 18 are preferably made of copper or nickel. The battery cell 11 is preferably manufactured in a manner described in detail in U.S. patent application Ser. No. 5,561,004, which is specifically incorporated herein.

Figure 3:
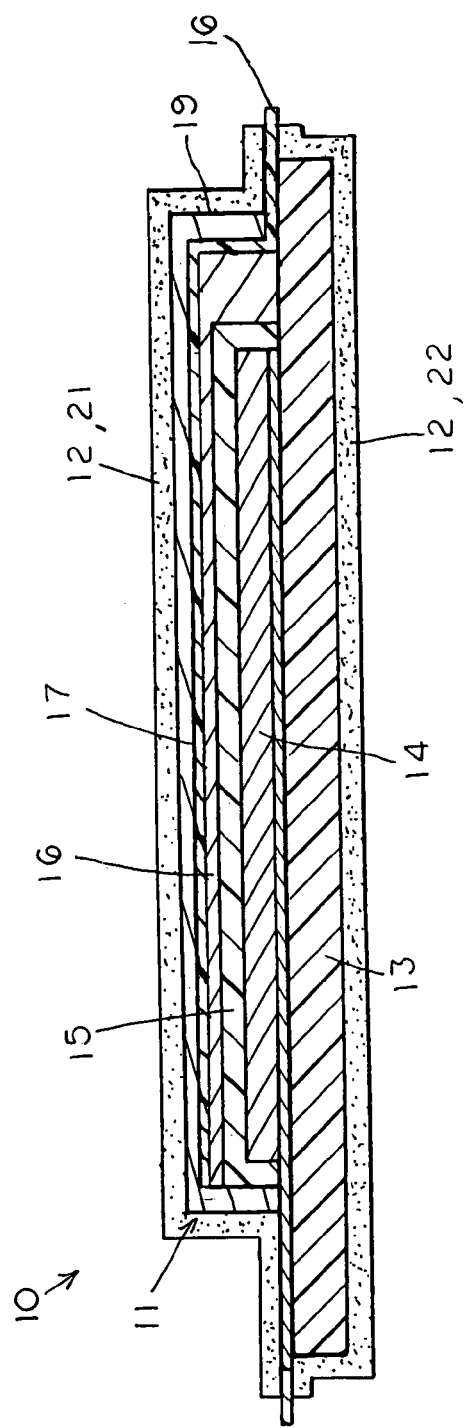
FIG. 3 is a partial cross-sectional side-view of the thin film battery cell and a pair of packaging foils and carriers shown prior to passing through a laminator.

With reference next to FIG. 3, to manufacture the battery 10 a top surface of packaging foil 22 is positioned to overlay the bottom surface of the substrate 13 while a bottom surface of packaging foil 21 is positioned to overlay the top surface of the passivation layer 19. The bottom and top layers of packaging foils 22 and 21 may be a laminated sheet of Class PPD or Class ECR packaging material made by Shield Pack, Inc. These packaging foils have an inward facing layer of polymer P1, an outwardly facing layer of polymer P2 and at least one intermediate layer of metal M, of course, the packaging foil may include several intermediate alternating layers of metal and polymer. A bottom sheet of carrier material 25 is positioned to overlay the bottom surface of packaging foil 22 while a top sheet of carrier material 24 is positioned to overlay the top surface of packaging foil 21. The carrier materials 24 and 25 may be 5 mil thick sheets of Kapton made by Dupont.

The battery cell 11, two layers of packaging foil 21 and 22, and two layers of carrier material 24 and 25 are then passed through a laminator having a pair of heated pressure applying means in the form of lamination rollers 29. The packaging foils 21 and 22 become packaging layer 12 in the final product. The lamination rollers 29 are preferably made of a soft material such as rubber and are approximately 5 centimeter in diameter. The purpose of the carrier materials 24 and 25 is to provide an even pressure and temperature to the underlying packaging foil during the lamination process.

Figure 2:
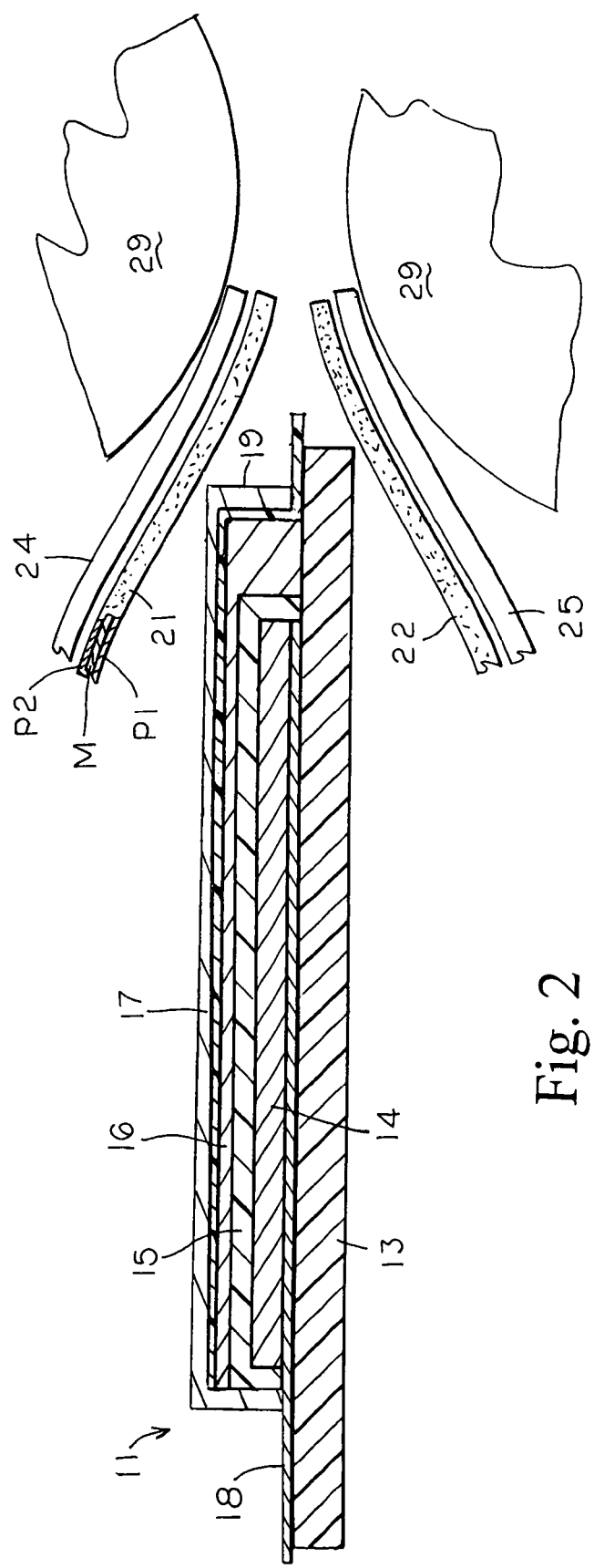
FIG. 2 is an illustration of the complete thin film battery having a protective packaging illustrating principles of the invention in a preferred embodiment, shown subsequent to passing through the laminator.

The temperature, pressure and rate of travel through the laminator causes the interior surface of the packaging foils 21 and 22 to be heat sealed to the corresponding surface of the battery cell 11 facing the packaging foils. As such, the interior surface of the bottom layer of packaging foil 22 is heat sealed to the bottom surface of the substrate 13 and the interior surface of the top layer of packaging foil 21 is heat sealed to the top surface of the passivation layer 19, as shown in FIG. 2. Although within the scope of the present invention many different combinations of temperature, pressure and material travel speeds through the laminator may be discovered which heat seals the packaging layers to the battery cell. However, it has been discovered that a temperature of 155 degrees Celsius, a pressure of 5 p.s.i and a travel speed of 25 cm/min for a Class PPD packaging material produces a proper heat seal between the packaging foils and the battery cell.

It has been discovered that by heat sealing the packaging foils directly to the battery cell the battery cell is provided with a substantially improved protective layer thereby improving the overall packaged battery. This improvement is achieved in part by the lamination process wherein as the packaging foils are heat sealed to the battery cell and as such occurs the gases between the foils and the battery cell are driven out. The use of packaging materials with the prior art batteries produced spaces between the battery cell and the packaging material, thereby allowing the capture of gases within these spaces which could degrade the components of the battery cell. The process of laminating the packaging material directly to the battery cell also creates a smaller overall battery, a problem which exists wherein the space occupied by the battery is intended to be as small as possible. Lastly, the lamination process causes the packaging material to be bonded to the side edges of the battery cell, thereby once again eliminating space between the battery cell and packaging material wherein harmful gases may in entrapped. This is enhanced by the softness and diameter of the lamination rollers 29 which determine the extent to which the packaging foil is forced against, and thereby sealed within, the side edges and inward corners of the battery cell.

It should be understood that while the present invention strives to laminate the exterior surfaces of the battery cell completely with the packaging material, the invention is not limited to such. However, it is desirous to laminate at least a majority of the top surface of the battery cell, the active material surface, so as to be in sealing engagement with the packaging foil, thereby eliminating virtually all gases therebetween. The packaging foil may be one sheet of packaging foil folded over itself or two separate sheets of packaging foil. Also, the laminating process may be carried out with the use of a platen laminator which consists of pressure applying means in the form of two oppositely disposed heated plates which are moved towards each other in pressing the material therebetween.

It should also be understood that the present invention is not limited to the use of lithium ion batteries and that the invention may be utilized with many types of thin film battery cells. Also, the arrangement of the cathode, electrolyte and anode may be inverted as compared to that shown in the drawings.

Lastly, it should be understood that the battery cell utilized in practicing the invention is not required to be passivated, as the packaging material can be heat sealed directly to the anode or anode current collector.

It thus is seen that a packaged battery is now provided which is sealed to prevent unwanted exposure to gases. It should of course be understood that many modifications may be made to the specific preferred embodiment described herein, in addition to those specifically recited herein, without departure from the spirit and scope of the invention as set forth in the following claims.

The invention claimed is:

1. A method of sealing a battery cell having a top surface, a bottom surface and peripheral edges, the method comprising the steps of:
    (a) positioning a first layers of packaging foil over the top surface of the battery cell;
    (b) positioning a second layer of packaging foil over the bottom surface of the battery cell; and
    (c) heat sealing the first layer of packaging foil to the top surface of the battery cell, heat sealing the second layer of packaging foil to the bottom surface of the battery cell, and heat sealing the first layer of packaging foil to the second layer of packaging foil about the periphery of the battery cell.

2. The method of claim 1 wherein said first layer and said second layer of packaging foil are multi-layered laminates which includes at least one metallic layer and at least one polymer layer.

3. The method of claim 1 wherein step (c) the heat sealing is conducted in part by two oppositely disposed pressure applying means between which the top layer, battery cell and bottom layer are passed.

4. The method of claim 1 wherein step (c) the first layer is sealed to a majority of the top surface of the battery cell.

5. The method of claim 4 wherein step (c) the second layer is sealed to a majority of the bottom surface of the battery cell.

6. The product formed by the method of claim 1.

7. A method of sealing a battery cell having a top surface, a bottom surface and peripheral edges, the method comprising the steps of:
    (a) providing a first layer of packaging foil;

(b) providing a second layer of packaging foil;
(c) positioning a battery cell between the first and second layers of packaging foil;
(d) heating the first and second layer of packaging foil; and
(e) pressing the first layer against the top surface of the battery cell and pressing the second layer against the bottom surface of the battery cell,
whereby the heating and pressing of the first and second layers against the battery cell causes the first and second layers to be sealed to the battery cell.

8. The method of claim 7 wherein said first layer and said second layer of packaging foil are multi-layered laminates which includes at least one metallic layer and at least one polymer layer.

9. The method of claim 7 wherein step (e) the pressing of the packaging foils against the battery cell is conducted by two oppositely disposed pressure applying means between which the top layer, battery cell and bottom layer are passed.

10. The method of claim 7 wherein step (e) the first layer is sealed to a majority of the top surface of the battery cell.

11. The method of claim 10 wherein step (c) the second layer is sealed to a majority of the bottom surface of the battery cell.

12. The product formed by the method of claim 7.

13. A method of sealing a battery cell having an exterior top surface, an exterior bottom surface and exterior peripheral edges, the method comprising the steps of:
    (a) providing two sheets of overlaying packaging foils;
    (b) positioning a battery cell between the two sheets of packaging foil;
    (c) heat sealing the packaging foil to the exterior surface of the battery cell.

14. The method of claim 13 wherein the packaging foil is comprised of multi-layered laminates which includes at least one metallic layer and at least one polymer layer.

15. The method of claim 14 wherein step (c) the packaging foil is sealed to a majority of the exterior surface of the battery cell.

16. The product formed by the method of claim 13.

\* \* \* \* \*